(12) United States Patent
Sagiv et al.

(10) Patent No.: US 6,797,764 B2
(45) Date of Patent: Sep. 28, 2004

(54) WATER-BASED ADHESIVE

(75) Inventors: Efraim Sagiv, New Haven, CT (US);
Gary L. Diehl, Alliance, OH (US);
Leonard R. Howell, Vernon, CT (US);
Julius C. Fister, Hamden, CT (US)

(73) Assignee: Olin Corporation, Waterbury, CT (US)

( * ) Notice: Subject to any disclaimer, the term of this patent is extended or adjusted under 35 U.S.C. 154(b) by 0 days.

(21) Appl. No.: 09/907,224

(22) Filed: Jul. 17, 2001

(65) Prior Publication Data

US 2002/0002232 A1 Jan. 3, 2002

Related U.S. Application Data

(63) Continuation-in-part of application No. 09/497,562, filed on Feb. 3, 2000, now abandoned.

(51) Int. Cl.$^7$ .............................................. C09J 175/06
(52) U.S. Cl. .................... 524/501; 524/591; 156/331.7; 427/388.4
(58) Field of Search ................................. 524/501, 591; 156/331.7; 427/388.4

(56) References Cited

PUBLICATIONS

Search by Scientific and Technical Information Center Nov. 3, 2003.*

* cited by examiner

*Primary Examiner*—Peter Szekely
(74) *Attorney, Agent, or Firm*—Todd E. Garabedian; Wiggin and Dana LLP

(57) ABSTRACT

The present invention is directed to a water-based adhesive composition, comprising an admixture of: (A) about 5 to about 80 wt % of an aqueous polyester polyurethane dispersion; and (B) about 95 to about 20 wt % of an aqueous aliphatic polyurethane dispersion. The present invention is also directed to a method of adhering a workpiece or adherent to a substrate using the above water-based adhesive composition.

25 Claims, No Drawings

WATER-BASED ADHESIVE

CROSS-REFERENCE TO RELATED APPLICATIONS

This application is a Continuation-in-Part of U.S. Ser. No. 09/497,562, filed Feb. 3, 2000, now abandoned.

BACKGROUND OF THE INVENTION

1. Field of the Invention

The present invention relates to water-based adhesives, and more particularly to a water-based adhesive composition, comprising an admixture of an aqueous polyester polyurethane dispersion and an aliphatic polyurethane dispersion

2. Description of the Related Art

Polyurethanes are used in a variety of fields such as adhesives, impregnation agents, and coating agents. Polyurethanes have been particularly useful in the adhesive field due primarily to their desirable adhesive properties to a wide range of substrates including metals, woods, fabric, plastics, and the like. Polyurethane-based adhesives have been demonstrated to offer good chemical resistance, elasticity, and durability. Due to these advantages, polyurethane adhesives have found many applications, particularly in the automotive field and other fields where adhesion durability is desired.

Automobiles are exposed to a variety of environmental factors, such as wide temperature fluctuations, wind, water, salt, road dirt, insects and UV radiation. The adhesives used in bonding trim or other pieces must be resistant to these factors for many years in order to meet the quality standards that are demanded in the current marketplace. In addition, strict environmental regulations have limited the use of solvent-based adhesives. The solvents used in the manufacture of these adhesives result in several disadvantages. The organic solvents generally evaporate quickly and result in an adhesive mixture that may become too viscous for many applications. In addition, the costs associated with disposal of the organic solvents result in a higher cost of the product. Moreover, the vaporized solvents that are produced during manufacture or cure have an adverse effect on the environment and the workplace in that they are often toxic and/or odoriferous.

In addition to the above problems, manufacturers are using larger amounts of certain plastics, such as ABS plastic, which are resistant to certain adhesives. Forming metal-plastic laminates with these particular plastics has proven difficult due to unsuitable adhesives that are currently available.

Aqueous water-based adhesives have been utilized as a replacement for adhesives using organic solvents, and are the subject of existing patents. However, while environmentally responsible, current aqueous adhesives do not provide the level of adhesion and durability offered by adhesives using an organic solvent.

U.S. Pat. No. 4,507,430 to Shimeda discloses a water-based polyurethane emulsion useful for an adhesive or coating for a polyolefin resin, comprising a hydrogenated polyol component and a polyisocyanate component.

U.S. Pat. No. 4,740,536 to Chao discloses a water-based binder, coating, and adhesive composition comprising an aqueous dispersion of polymer latex and an amine curing agent. The polymer latex is alkali-curable and polymerized from a monomer mixture containing quaternary ammonium monomer and an epoxy resin.

U.S. Pat. No. 4,792,574 to Berkowitz discloses a stable polymer/polyisocyanate dispersion comprising a polyisocyanate, and a polymer that is the reaction product of an ethylenically unsaturated macromolecular monomer, a functional monomer, and at least one other ethylenically unsaturated monomer.

U.S. Pat. No. 5,523,344 to Maksymkiw et al. discloses an adhesive formulation comprising a hydrophobic elasticizer, and an aqueous plasticized dispersion consisting of sulfonated polyester urethane, a nonsulfonated polyester urethane, and a water-based polymer or copolymer.

U.S. Pat. No. 5,688,356 to Sagiv discloses a water-based adhesive composition made from two urethane resins, and methods of using the adhesive to adhere workpieces together.

What is needed in the art is an environmentally safe adhesive formulation that provides high adhesive strength over a wide variety of environmental conditions and with a wide variety of substrates, particularly resistant substrates like ABS plastics or laminates of metal and plastic. The present invention is believed to meet that need.

SUMMARY OF THE INVENTION

In one aspect, the present invention is directed to a water-based adhesive composition, comprising an admixture of: (A) about 5 to about 80 wt % of an aqueous polyester polyurethane dispersion; and (B) about 95 to about 20 wt % of an aqueous aliphatic polyurethane dispersion.

In another aspect, the present invention is directed to a water-based adhesive composition, comprising an admixture of: (A) about 17.5 to about 22.5 wt % of an aqueous polyester polyurethane dispersion; (B) about 82.5 to about 77.5 wt % of an aqueous aliphatic polyurethane dispersion; (C) about 0.005 to about 2 wt % of one or more additives selected from the group consisting of film-forming agents, adhesion promoters, tackifiers, surfactants, defoamers, and combinations thereof; and (D) about 0.5 to about 25 wt % of a solvent selected from the group consisting of water, N-methylpyrrolidone, butylcarbitol, 2-butoxyethanol, and combinations thereof.

In yet another aspect, the present invention is directed to a method of adhering a workpiece to a substrate, comprising the steps of: (A) applying a water-based adhesive composition to a substrate, said water-based adhesive composition comprising an admixture of: (1) about 17.5 to about 22.5 wt % of an aqueous polyester polyurethane dispersion; (2) about 82.5 to about 77.5 wt % of an aqueous aliphatic polyurethane dispersion; (3) about 0.005 to about 2 wt % of one or more additives selected from the group consisting of film-forming agents, adhesion promoters, tackifiers, surfactants, defoamers, and combinations thereof; and (4) about 0.5 to about 25 wt % of a solvent selected from the group consisting of water, N-methylpyrrolidone, butylcarbitol, 2-butoxyethanol, and combinations thereof; (B) curing said water-based adhesive onto said substrate; and (C) adhering said workpiece onto said substrate.

These and other aspects will be more fully understood from the following detailed description of the invention.

DETAILED DESCRIPTION OF THE INVENTION

It has now been surprisingly found, in accordance with the present invention, that a combination of about 5 to about 80 wt % of an aqueous polyester polyurethane dispersion and about 95 to about 20 wt % of an aqueous aliphatic polyurethane dispersion provides greater adhesion characteristics (as measured by peel tests) than either of the two components taken individually. The high adhesion strength is especially attractive for applications such as automotive trim where a water-based adhesive is advantageous for several reasons.

The water-based nature of the composition alleviates the use and disposal of toxic organic compounds. Government regulation of the use and disposal of toxic organic substances has forced many manufacturers to turn to water-based compositions. In addition, the water-based nature of the adhesive composition of the present invention results in less volatile organic fumes being given off during application and drying processes. In addition, cleanup is accomplished easily with water.

The adhesive composition of the invention is useful in any application where a durable, environmentally safe adhesive with high adhesion characteristics is required. One particularly useful application of the water-based adhesive composition of the present invention is in the manufacturing of trim pieces or window or door seals for automobiles. Automobiles are constantly attacked by harsh elements such as wind, water, salt, sand, and UV light. The adhesives that are used in the manufacturing of the various trim pieces or seals must be able to withstand this attack for many years. The adhesive composition of the present invention provides enhanced adhesion of various trim pieces to a wide variety of polymers to better endure the environmental factors that automobiles face, and provide a higher level of quality for the automobile. The adhesive composition of the invention is also particularly suitable for adhering "resistant" plastics, such as ABS plastic, to metals to form laminates.

In addition, the invention also allows the adhesive to be applied to a continuous metal web such as in gravure coating, doctor blading, or spraying, and the web subsequently dried or cured in a furnace before it is coiled. Advantageously, the adhesive composition of the invention exhibits low levels of "blocking" (e.g., cured adhesive sticking to itself). This advantageous feature is particularly useful in storing coiled substrates having cured adhesive applied thereon.

The term "dispersion", as used herein, refers generally to a two-phase system where one phase consists of finely divided particles distributed throughout a bulk substance (usually a solvent). The term "emulsion" refers to a stable mixture of two or more immiscible liquids held in suspension by small amounts of emulsifiers. As used herein, the term "water-based" refers to resins or other materials in which water is a component (i.e., about at least 10% by weight).

As indicated above, the invention is directed to a water-based adhesive composition, comprising an admixture of: (A) an aqueous polyester polyurethane dispersion; and (B) an aqueous aliphatic polyurethane dispersion. Each of these components is discussed in detail below.

The first component of the composition of the invention is an aqueous polyester polyurethane dispersion. Any aqueous polyester polyurethane dispersion may be used in the composition of the invention. However, a particularly useful aqueous polyester polyurethane dispersion is a sulfonated polyester polyurethane dispersion sold by Bayer under the tradename of DISPERCOLL U54, and has a solids content of about 50%. A useful alternative aqueous polyester polyurethane dispersion is another sulfonated polyester polyurethane dispersion also sold by Bayer under the tradename of DISPERCOLL U53. Preferred amounts of the aqueous polyester polyurethane dispersion generally range from about 5 to about 80 wt %, more preferably from about 15 to about 25 wt %, and even more preferably from about 17 to about 23 wt % of said admixture, all percentages based on the total weight of the composition.

The aqueous polyester polyurethane dispersion is made from a polyester polymer and a diisocyanate compound. The polyester polymer portion of the aqueous polyester polyurethane is preferably made by condensing 1,4-butanediol or 1,2-ethanediol with adipic acid. The diisocyanate compound used in the aqueous polyester polyurethane dispersion is preferably a diisocyanate compound selected from the group consisting of hexamethylene diisocyanate, isophorone diisocyanate, and combinations thereof. Sulfonated derivatives of the polyester polyurethane may be made by utilizing sulfonated starting materials such as sulfonic acid, or sulfonating the condensation product using methods well known in the art.

The aqueous aliphatic polyurethane dispersion component of the present composition is preferably a material sold under the trade name QUINN QW 26 (available commercially from SIA Polymers, Seabrook, N.H.) and has an acid number of about 28. When cured, this particular product, by itself, has a sword hardness of about 40. The solvent portion of the dispersion generally comprises 65% of the component, and may be water, or a combination of water and water-miscible or water-immiscible organic solvents. Another preferred material having a similar combination of ingredients is sold under the tradename QUINN QW 18-1 (also available commercially from SIA Polymers), and has an acid number of about 36. When cured, this particular product, by itself, has a sword hardness of about 25.

Preferred amounts of the aqueous aliphatic polyurethane dispersion generally range from about 95 to about 20 wt %, more preferably from about 85 to about 75 wt %, and even more preferably from about 82 to about 78 wt % of said admixture, all percentages based on the total weight of the composition.

Additional additives may be added to the composition of the invention. Such additional additives include, but are not limited to, film-forming agents, slip agents, flow agents, adhesion promoters, tackifiers, surfactants, defoamers, decorative components, and combinations thereof.

2-Butoxyethanol may be added to the adhesive composition of the invention as a film-forming agent. The film-forming agent is added to the composition to provide a smooth coating surface for maximum coating area. Alternative film-forming agents include N-methylpyrrolidone, diethylene glycol, or other organic solvents known in the art that have boiling points higher than that of water.

Slip and flow agents may also be added to the composition of the invention to permit the adhesive to flow evenly. Slip agents lower the coefficient of friction of the cured adhesive coating in order to make it slip more easily over forming or cutting tools. Flow agents allow the wet or liquid adhesive to flow evenly over the substrate surface to provide a uniform coating of adhesive. Such slip and flow agents include polyether modified polydimethylsiloxane (sold by Dow Corning under the tradename Dow Corning #30), silicone compounds containing silanol (sold by Dow Corning under the tradename Dow Corning #51), and polyester modified dimethylsiloxane (sold by BYK Chemie under the tradename BYK 333).

A surfactant may be added to the coating composition of the invention to aid in leveling the composition on the substrate as it is applied. One preferred type of surfactant useful in the coating composition of the invention are the silicon-based surfactants, such as "SILWET" (Witco Chemical Co.). Another exemplary surfactant useful in the composition of the invention includes poly(oxyethylene/oxypropylene) alkyl ethers sold under the trademark "POLYTERGENT". Alternatively, nonionic surfactants which are coblock polymers of ethylene oxide/propylene oxide monomers may be used in the formulation of the invention. These compounds are known commercially as the "POLYTERGENT" P and E Series and are available from Arch Chemical Corporation. Particularly useful surfactants are the hydroxylated dimethylsiloxanes, such as Dow Corning Q2-5211 available from Dow Corning.

Additional surfactants that are useful in the composition of the invention include modified alcohol ethoxylates, EO/PO block copolymers (repeating units of ethoxy and propoxy groups), copolymers of EO/PO sold under the trademark "BASF PLURONICS", alkoxylated straight chain alcohols sold under the trademark "PLURFACS", alkoxylated fatty acids, alkoxylated alcohols and coblock polymers of EO/PO sold under the trademark "MACOL", alkoxylated alcohols sold under the trademark "TRITON DF", alkylated secondary alcohols sold under the trademark "TERGITOL", "MINIFOAM", "15S" and "TMN"; and alkoxylated linear alcohols and glycols sold under the trademark "SURFONIC".

Adhesion promoters that are suitable for the composition of the present invention include epoxylated silane adhesion promoters such as γ-glycidoxypropyltrimethoxy silane, and related compounds. Suitable combinations of epoxylated silane adhesion promoters may also be used. The epoxylated silane adhesion promotor component of the invention preferably ranges from about 0.05 wt % to about 2 wt %, based on the total weight of the composition. If γ-glycidoxypropyltrimethoxy silane is used as the adhesion promotor, useful amounts range preferably between about 0.5 to about 1.5 wt %, and more preferably between about 0.75 and about 1.0 wt %, based on the total weight of the composition.

γ-Glycidoxypropyltrimethoxy silane is available commercially from Dow Corning and is sold under product number Z6040. The appropriate amount of epoxylated silane adhesion promotor may be diluted (e.g., 50%) in a suitable solvent. For example, one may add 2.0 wt % of a 50:50 (w:w) mixture of epoxylated silane adhesion promotor agent and N-methylpyrrolidone.

Tackifiers may be added to the composition of the invention to make the adhesive composition tacky and to wet the surface of the substrate as the adhesive is applied. A preferred tackifier that is useful in the composition of the invention is an aqueous dispersion of rosin ester sold under the name of TACOLYN 1085 (available from Hercules Incorporated, Wilmington, Del.) Other useful tackifiers include Dresinol 215, aromatic vinyl copolymer tackifiers such as Piccotex LC (Hercules Inc.), and Pentalyn (Hercules Inc.).

A defoaming agent may be included in the adhesive composition of the invention to prevent air entrapment during processing and to provide a smooth coating surface that provides maximum surface area for adhesion. Exemplary defoaming agents include siloxane-based defoaming agents such as Dow Corning #62, silicone oils, phosphate esters, alcohols, or glycols sold under the trademark "ANTAROX", as well as blends of these. A particularly useful defoaming agent is a polyether modified dimethylsiloxane, such as Dow Corning additive #62 (available from Dow Corning).

The adhesive composition of the present invention may be used in clear form, or may include a decorative component, such as a colorant dye, pigment, metal flake or powder, or glass flake or powder, to provide the adhesive with color or other decorative effect. Particularly useful decorative additions to the composition of the present invention are inks that impart a color to the coating composition. A variety of suitable inks are available commercially from Tech Ink Inc. (Akron, Ohio). In one embodiment, the coating composition of the invention includes a red ink such as red ink number A-3701 from Tech Ink, Inc.

Any additional additives should generally comprise, in total, from about 0.005 to about 2 wt %, more preferably from about 0.01 to about 1.5 wt %, and most preferably from about 0.05 to about 1 wt %, based on the total weight of the adhesive composition.

Optionally, additional solvent may be added to the coating composition of the invention to achieve a specific viscosity for applications such as spraying, or to achieve a certain dry/cure time. Suitable solvents include water, combinations of water and water-miscible or water-immiscible organic solvents. Useful solvents include water, N-methylpyrrolidone, butylcarbitol, 2-butoxyethanol, 2,2-butoxyethoxyethanol, various alcohols, and the like. Suitable combinations of these solvents may also be employed in the composition of the present invention. Useful amounts of these solvents range from 0.5 to 25 wt %, based on the total amount of the adhesive composition.

The adhesive composition of the present invention is prepared by mixing the carboxylated urethane polymer dispersion mixture, the aqueous polyester polyurethane dispersion, and any additional components such as film-forming agents, slip agents, flow agents, cross-linkers, tackifiers, surfactants, defoamers, decorative components, solvents, and the like, in a commercial mixer, such as a Ross mixer. The entire mixture is blended until a smooth and homogeneous adhesive composition is obtained.

The prepared adhesive composition may be applied to a variety of substrates such as stainless steel, aluminum, copper, iron, cold rolled steel, phosphatized steel, steel coated with conventional primers such as electrodeposition primers and the like, plastic substrates such as polyester reinforced fiber glass, butyrates, PVC, ABS, injection molded urethanes, polystyrenes, polyimides, polyamides, and the like. In some cases, the substrate should be cleaned prior to coating with the composition of the invention to assure good adhesion and durability.

The adhesive composition of the invention may be applied to the selected substrate by any method known in the art, such as draw down rod, doctor blading, gravure roll, spraying, dipping, and the like. Preferably, the coating composition of the invention is applied to the metal substrate at about 0.1 to 0.5 mil wet thickness, and is cured in an oven at a temperature between 350° F. and 500° F. for 20 seconds to about 20 minutes. A preferred cure procedure is heating in a convection oven set to about 450° F. and exposing the coated substrate to that temperature for about 43 seconds. The thickness of the dried coating is generally in the range of from about 0.1 to about 0.2 mil.

A workpiece, such as rigid polyvinyl chloride (PVC), is next applied to the cured adhesive. The workpiece may be applied to the cured adhesive in several ways. In one embodiment generally useful in small scale applications, such as in a laboratory, the adhesive-coated aluminum coupon is warmed (i.e., to approximately 470° F.) and pressed onto the PVC workpiece at about 100 psi for about 7 seconds.

In an alternative embodiment, the workpiece may be applied to the adhesive-coated substrate in a continuous manner. Freshly produced PVC workpiece may be extruded from an extruder and applied to an adhesive-coated aluminum strip moving on a conveyor. Pressure (i.e., approximately 3500 psi) is applied to the laminate to adhere the substrate and the workpiece together. This embodiment is particularly suitable for commercial applications when large amounts of laminate must be produced rapidly.

In another embodiment, the workpiece may be applied to the adhesive-coated substrate in a continuous manner through an injection molding process. Freshly produced PVC liquid workpiece may be fed to an injection molding die where it comes into contact with an adhesive-coated aluminum strip moving through the die. Pressures on the liquid PVC up to 10,000 psi ensure the PVC makes intimate contact with the adhesive coated aluminum strip or substrate and adheres to the substrate. The injection molding die forms the PVC into the desired shape. On exiting the die the molded PVC and aluminum component is water cooled to maintain the desired shape. This embodiment is particularly suitable for commercial applications when large amounts of automotive trim or weather seals must be produced rapidly.

The laminate or composite produced above can be evaluated for adhesion and/or peel strength using an Instron tensile tester or equivalent apparatus. In one embodiment, the apparatus is arranged to measure tensile peel strength of the adjacent polymer and metal components of the laminate either perpendicularly (90°) or parallel (180°) from the laminate surface. The tensile strength of the laminate is measured in pounds per linear inch (lbs/LI). Preferably, the adhesive composition of the invention is formulated to yield adhesive values that are greater than the cohesive strength of the rigid PVC to assure that the adhered PVC remains adhered to the substrate under environmental or physical stress. Preferably, the adhesion or tensile peel strength is approximately 10–60 lbs/LI, depending on the thickness of the metal substrate and the cohesive strength of the adherents. For example, a PVC plastic adherent adhered to an aluminum sheet that is 8 mil thick preferably has tensile peel strength in the range of about 40–50 pli. A PVC plastic adherent adhered to an aluminum sheet that is 2 mil thick preferably has tensile peel strength in the range of about 14–20 pli. In another example, a butyrate plastic adherent adhered to an aluminum sheet that is 2 mil thick preferably has tensile peel strength in the range of about 10–14 pli.

The water-based adhesive composition of the invention possesses excellent adhesive characteristics between substrates such as metal and plastic, particularly resistant plastics such as ABS plastic. The adhesive composition of the invention also has a low VOC (volatile organic content), excellent substrate adhesion, and is suitable for many applications, such as manufacturing of automotive trim parts, and the like, where durability and long adhesion life are required. The composition of the present invention also possesses low VOC content (about 1.8 lbs/gallon (minus water) and about 0.88 lbs/gallon including water) making it an environmentally innocuous product.

The following Examples are provided to better illustrate the present invention. All parts and percentages are by weight and all temperatures are degrees Celsius, unless explicitly stated otherwise.

EXAMPLES

Examples 1–5

Separate aluminum strips (8 mil thick) were coated with the adhesive compositions shown in Table I. The amount of adhesive resulted in an adhesive layer of approximately 0.2 mil thick. The coated aluminum substrates were cured at 450° F. for approximately 40 seconds, and an ABS substrate was laminated onto the cured adhesive. The lamination procedure proceeded at 450° F. for 10 seconds at 100 psi. Peel strength was measured as described above.

TABLE I

| Example | Aqueous Polyester Polyurethane Dispersion (DISPERCOLL U54), wt % | Aliphatic Polyurethane Dispersion (Quinn QW 26), wt % | Additives (wt %) | Peel Strength (PLI) |
|---|---|---|---|---|
| 1 | 20 | 80 | None | 59.5 |
| 2 | 20 | 72 | Tackifier, 8 wt % | 57.0 |
| 3 | 20 | 72 | Tackifier, 8 wt % | 57.3 |
| 4 | 57.5 | 42.5 | *** | 63 |
| 5 | 20 | 80 | *** | 63 |

*** = Examples 4 and 5 each included the following additional additives: 0.2 wt % adhesion promotor (γ-glycidoxypropyltrimethoxy silane), 0.11 wt % slip/flow agent (polyester modified dimethylsiloxane, BYK 333), 0.01 wt % defoamer, polyether modified dimethylsiloxane), 2.79 wt % N-methylpyrrolidone solvent.

As can be seen in Table I, all compositions provided acceptable peel strengths in the range of about 60 PLI.

Examples 6–11

Aluminum strips (8 mil thick) were prepared as described above and attached to various plastic adherents. Lamination conditions for adhesion are: for butyrate, 400° F., 120 psi for 10 seconds. For ABS, ABS/PVC, and 1650 PVC: 450° F., 120 psi, for 10 seconds. Evaluation conditions for blocking (e.g., evaluating how cured adhesive sticks to itself) are as follows. Place 15 laminates of 2 mil×0.75 inch×1.5 inch together and laminate at 300 psi at approximately 140° F. for 5 minutes. The evaluation results are shown in Table II.

TABLE II

| Ex. | Aqueous Polyester Polyurethane Dispersion (DISPERCOLL U54), wt % | Aqueous Aliphatic Polyurethane Dispersion (Quinn QW 26), wt % | Adhesion, butyrate on 2 mil Al (PLI) | Adhesion, ABS on 8 mil Al (PLI) | Adhesion ABS/PVC on 8 mil Al (PLI) | Adhesion, PVC on 8 mil Al (PLI) | Blocking (9/LI) |
|---|---|---|---|---|---|---|---|
| 6 | 17.5 | 82.5 | 13.2 | 59.5 | 59.0 | 60.0 | 9.8 |
| 7 | 18.75 | 81.25 | 13.5 | 59.5 | 59.5 | 62.0 | 12.4 |
| 8 | 20.0 | 80.0 | 13.5 | 60.0 | 60.0 | 61.0 | 13.0 |
| 9 | 20.0 | 80.0 | 13.4 | 61.0 | 60.0 | 61.0 | 10.4 |

TABLE II-continued

| Ex. | Aqueous Polyester Polyurethane Dispersion (DISPERCOLL U54), wt % | Aqueous Aliphatic Polyurethane Dispersion (Quinn QW 26), wt % | Adhesion, butyrate on 2 mil A1 (PLI) | Adhesion, ABS on 8 mil A1 (PLI) | Adhesion ABS/PVC on 8 mil A1 (PLI) | Adhesion, PVC on 8 mil A1 (PLI) | Blocking (9/LI) |
|---|---|---|---|---|---|---|---|
| 10 | 21.25 | 78.75 | 13.3 | 60.0 | 58.5 | 58.0 | 18.4 |
| 11 | 22.5 | 77.5 | 13.5 | 61.5 | 59.0 | 61.0 | 22.6 |

As can be seen in Table II, all compositions adhered well to various plastic and metal substrates with minimal blocking.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A water-based adhesive composition, comprising an admixture of a polymer blend consisting the dispersions of A and B:
   A. about 5 to about 80 wt % of an aqueous sulfonated polyester polyurethane dispersion, that is the reaction product of (1) the condensation product of 1,4-butanediol or 1,2-ethanediol and sulfonic acid, and (2) a diisocyanate compound selected from the group consisting of hexamethylene diisocyanate, isophorone diisocyanate, and combinations thereof; and
   B. about 95 to about 20 wt % of an aqueous aliphatic polyurethane dispersion.

2. The water-based adhesive composition of claim 1, wherein said aqueous sulfonated polyester polyurethane dispersion comprises from about 15 to about 25 wt % of said admixture, based on the total weight of said composition.

3. The water-based adhesive composition of claim 1, wherein said aqueous sulfonated polyester polyurethane dispersion comprises from about 17 to about 23 wt % of said admixture, based on the total weight of said composition.

4. The water-based adhesive composition of claim 1, wherein said aqueous aliphatic polyurethane dispersion comprises from about 85 to about 75 wt % of said admixture, based on the total weight of said composition.

5. The water-based adhesive composition of claim 1, wherein said aqueous aliphatic polyurethane dispersion comprises from about 83 to about 78 wt % of said admixture, based on the total weight of said composition.

6. The water-based adhesive composition of claim 1, further comprising about 0.005 to about 2 wt % of one or more additives selected from the group consisting of film-forming agents, slip agents, flow agents, adhesion promotors tackifiers, surfactants, defoamers, decorative components, and combinations thereof.

7. The water-based adhesive composition of claim 6, wherein said adhesion promotor is an epoxylated silane adhesion promotor.

8. The water-based adhesive composition of claim 7, wherein said epoxylated silane adhesion promotor is γ-glycidoxypropyltrimethoxysilane.

9. The water-based adhesive composition of claim 1, further comprising from about 0.5 wt % to about 25 wt % of a solvent.

10. The water-based adhesive composition of claim 9, wherein said solvent is selected from the group consisting of water, N-methylpyrrolidone, butylcarbitol, 2-butoxyethanol, 2,2-butoxyethoxyethanol, and combinations thereof.

11. A water-based adhesive composition, comprising an admixture of a polymer blend consisting of the dispersions of A and B, blended with C and D:
   A. about 17.5 to about 22.5 wt % of an aqueous sulfonated polyester polyurethane dispersion, that is the reaction product of (1) the condensation product of 1,4-butanediol or 1,2-ethanediol and sulfonic acid, and (2) a diisocyanate compound selected from the group consisting of hexamethylene diisocyanate, isophorone diisocyanate, and combinations thereof;
   B. about 82.5 to about 77.5 wt % of an aqueous aliphatic polyurethane dispersion;
   C. about 0.005 to about 2 wt % of one or more additives selected from the group consisting of film-forming agents, adhesion promotors, tackifiers, surfactants, defoamers, decorative components, and combinations thereof; and
   D. about 0.5 to about 25 wt % of a solvent selected from the group consisting of water, N-methylpyrrolidone, butylcarbitol, 2-butoxyethanol, 2,2-butoxyethoxyethanol, and combinations thereof.

12. The water-based adhesive composition of claim 11, wherein said adhesion promotor is an epoxylated silane adhesion promotor agent.

13. The water-based adhesive composition of claim 12, wherein said epoxylated silane adhesion promotor is γ-glycidoxypropyltrimethoxysilane.

14. A method of adhering a workpiece to a substrate, comprising the steps of:
   A. applying a water-based adhesive composition to a substrate, said water-based adhesive composition comprising an admixture of a polymer blend consisting of the dispersions of steps 1 and 2, blended with the compounds of steps 3 and 4:
      1. about 17.5 to about 22.5 wt % of an aqueous sulfonated polyester polyurethane dispersion;
      2. about 82.5 to about 77.5 wt % of an aqueous aliphatic polyurethane dispersion;
      3. about 0.005 to about 2 wt % of one or more additives selected from the group consisting of film-forming agents, adhesion promotors, tackifiers, surfactants, decorative components, defoamers, and combinations thereof; and
      4. about 0.5 to about 25 wt % of a solvent selected from the group consisting of water, N-methylpyrrolidone, butylcarbitol, 2-butoxyethanol, 2,2-butoxyethoxyethanol, and combinations thereof;
   B. curing said water-based adhesive onto said substrate; and
   C. adhering said workpiece onto said substrate.

15. The method of claim 14, wherein said adhesion promotor is an epoxylated silane adhesion promotor.

16. The method of claim 14, wherein said epoxylated silane adhesion promotor is γ-glycidoxypropyltrimethoxysilane.

17. The method of claim 14, wherein said applying step is accomplished by draw down rod, doctor blading, gravure roll, spraying, or dipping.

18. The method of claim 14, wherein said curing step occurs at between 200 and 500° F. for between 2 and 50 seconds.

19. The method of claim 14, wherein said adhering step comprises pressing said substrate and said workpiece together at about 100 psi for approximately 5–60 seconds.

20. The method of claim 14, wherein said substrate is selected from the group consisting of stainless steel, aluminum, copper, iron, cold rolled steel, phosphatized steel, primer-coated steel, polyester reinforced fiber glass, butyrates, PVC, ABS, injection molded urethanes, polystyrenes, polyimides, polyamides, and combinations thereof.

21. A water-based adhesive composition, comprising an admixture of a polymer blend consisting of the dispersions of A and B blended with C:
   A. about 5 to about 80 wt % of an aqueous sulfonated polyester polyurethane dispersion, that is the reaction product of (1) the condensation product of 1,4-butanediol or 1,2-ethanediol and sulfonated acid, and (2) a diisocyanate compound selected from the group consisting of hexamethylene diisocyanate, isophorone diisocyanate, and combinations thereof;
   B. about 95 to about 20 wt % of an aqueous aliphatic polyurethane dispersion; and
   C. about 0.005 to about 2 wt % of an epoxylated silane adhesion promotor.

22. The water-based adhesive composition of claim 21, wherein said aqueous sulfonated polyester polyurethane dispersion comprises from about 15 to about 25 wt % of said admixture, based on the total weight of said composition.

23. The water-based adhesive composition of claim 21, wherein said aqueous aliphatic polyurethane dispersion comprises from about 85 to about 75 wt % of said admixture, based on the total weight of said composition.

24. The water-based adhesive composition of claim 21, wherein said epoxylated silane adhesion promotor is γ-glycidoxypropyltrimethoxysilane.

25. The water-based adhesive composition of claim 21, further comprising about 0.5 to about 25 wt % of a solvent selected from the group consisting of water, N-methylpyrrolidone, butylcarbitol, 2-butoxyethanol, 2,2-butoxyethoxyethanol, and combinations thereof.

* * * * *